Oct. 1, 1963

W. E. SEIBERT 3,105,817

FILTERING AND DRYING APPARATUS

Filed Nov. 7, 1960

4 Sheets-Sheet 1

INVENTOR
Walter E. Seibert

BY
Alex. E. MacRae
ATTORNEY

INVENTOR
Walter E. Seibert
BY
ATTORNEY

Oct. 1, 1963
W. E. SEIBERT
3,105,817
FILTERING AND DRYING APPARATUS
Filed Nov. 7, 1960
4 Sheets-Sheet 4
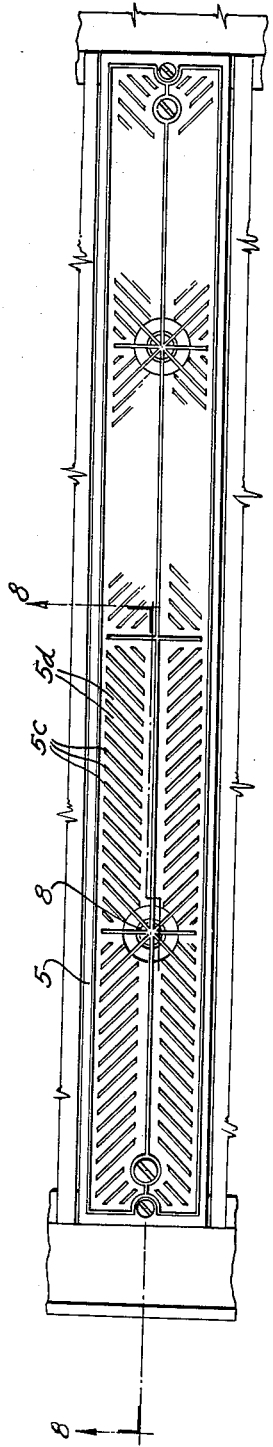
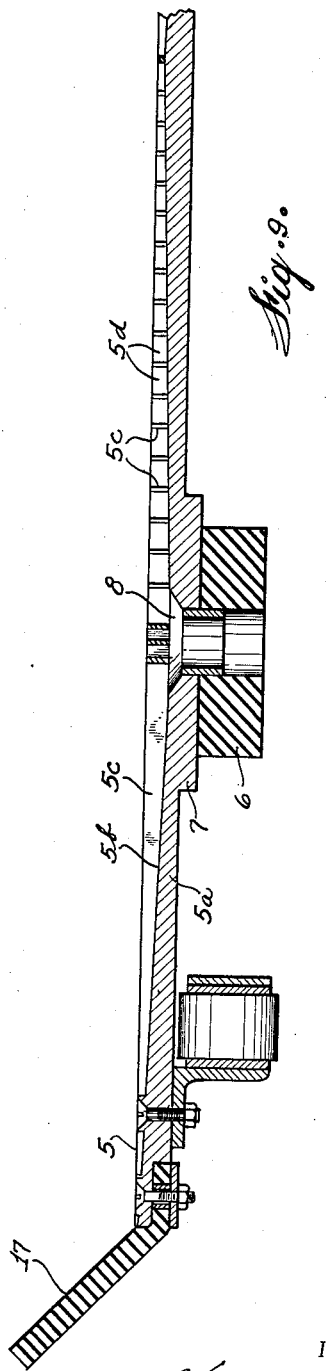
INVENTOR
Walter E. Seibert
BY Alex E. MacRae
ATTORNEY

United States Patent Office 3,105,817
Patented Oct. 1, 1963

3,105,817
FILTERING AND DRYING APPARATUS
Walter E. Seibert, 120 Broadway, Room 1116,
New York 5, N.Y.
Filed Nov. 7, 1960, Ser. No. 67,685
1 Claim. (Cl. 210—401)

This invention relates to filtering and drying apparatus and is a continuation-in-part of application Serial No. 703,551, filed December 18, 1957, now abandoned.

An object of this invention is to provide a filter of the type including an endless filter assembly comprising a plurality of grids and having an improved driving means for said assembly.

Another object is to provide a filter of the type set forth which includes simple and possible means for retaining the material under treatment on the filter assembly.

Another object is to provide, in association with a filter apparatus of the type set forth, means for ensuring constant alignment of the filter medium.

Another object is to provide, in association with the filter assembly, a suitable drying apparatus for further treatment of the filter cake.

Figure 1:
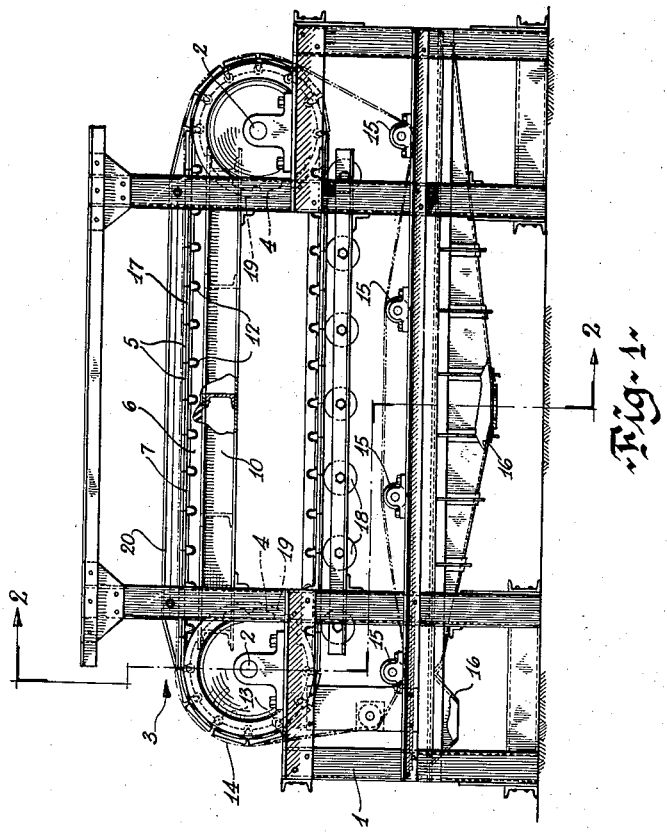
Figure 2:
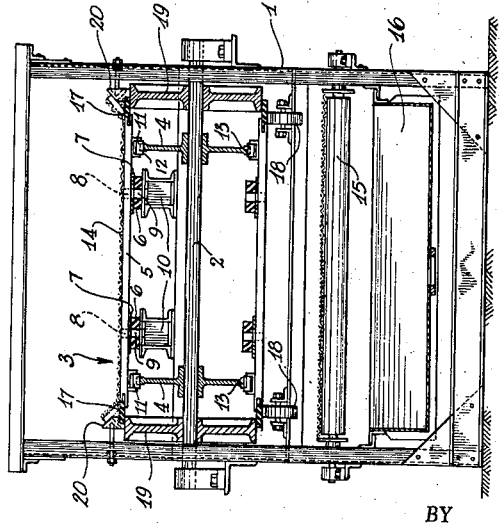
Figure 3:
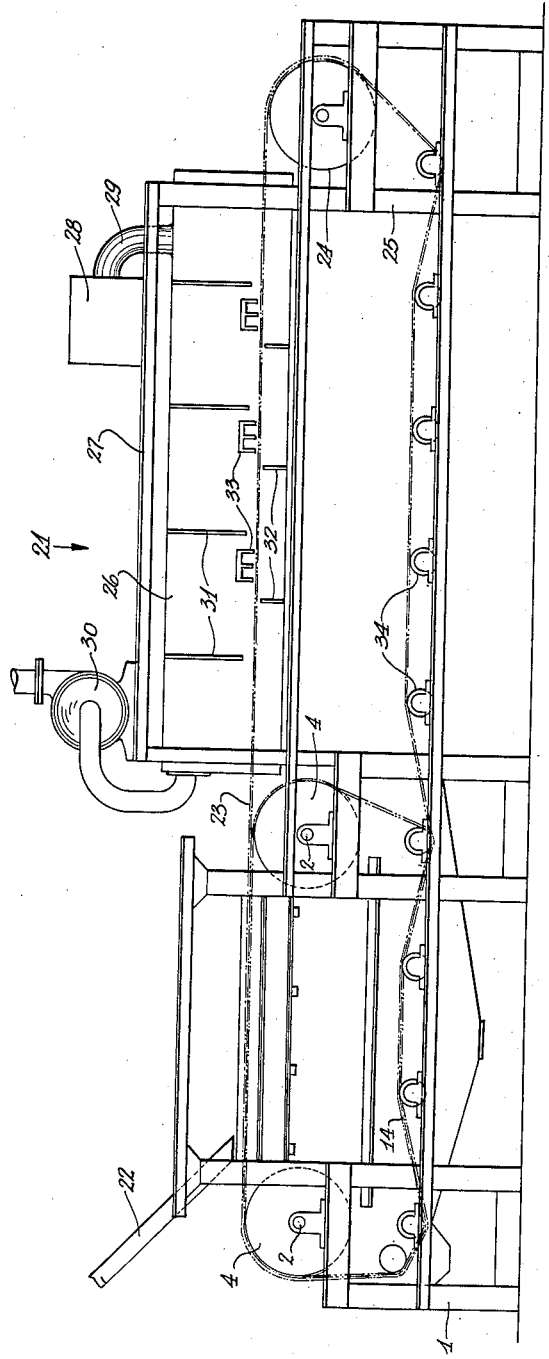
Figure 4:
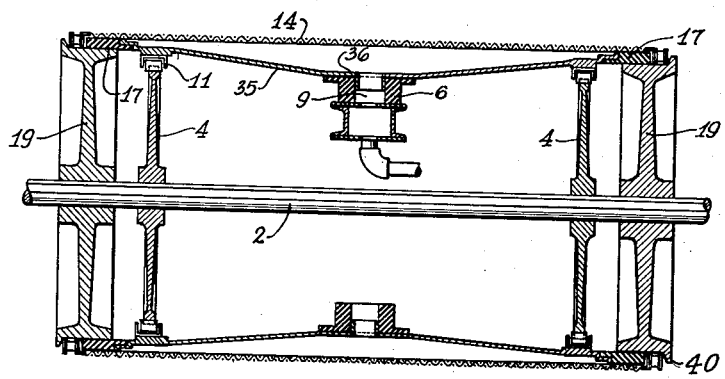
Figure 5:
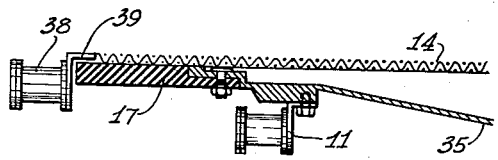
Figure 6:
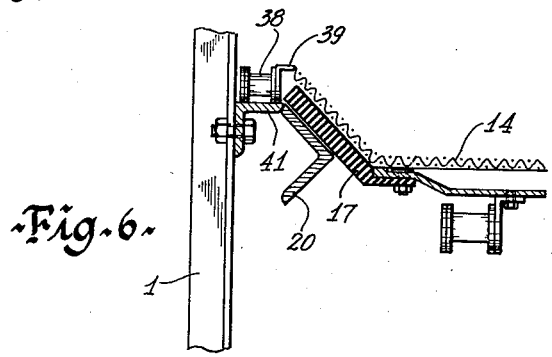
Figure 7:
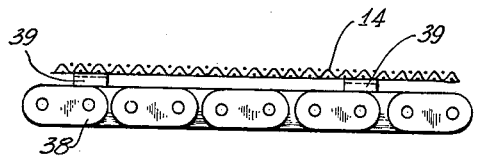

Other objects, details, and advantages of the invention will become apparent as this description proceeds, with particular reference to the accompanying drawings, in which:

FIGURE 1 is a side elevation of a filtering apparatus in accordance with the invention, FIGURE 2 is a sectional end elevation on line 2—2 of FIGURE 1, FIGURE 3 is a side elevation, in partly diagrammatic form, of the filter apparatus in association with a dryer, FIGURE 4 is a partial cross sectional elevation of a modified form of apparatus, FIGURE 5 is an enlarged cross sectional elevation of a portion of the apparatus shown in FIGURE 3, FIGURE 6 is an enlarged cross sectional elevation of a portion of the apparatus shown in FIGURE 3 is another position thereof, FIGURE 7 is a partial end elevation of the filter medium and associated aligning means, FIGURE 8 is an enlarged partial plan view of a filter assembly, and FIGURE 9 is an enlarged sectional view on line 8—8 of FIGURE 7.

In the drawing, 1 is a suitable framework in which is journalled a pair of shafts 2 for support of an endless filter assembly generally indicated at 3 as by means of a pair of sprockets 4 fixed to each shaft.

The filter assembly comprises, as shown, a plurality of rigid grids 5 mounted on one or two (as shown) endless flexible bands 6 of rubber, plastic, or the like. Each grid may, but not necessarily, have a pair of plates or pads 7 fixed to the bottom surface thereof and the bands 6 may be, as shown, secured thereto. Each grid is formed of a rigid material, such as metal or plastic composition, and comprises a bottom wall 5a, the top surface 5b of which is inclined towards a drainage aperture 8. A plurality of filter medium supporting ribs 5c extend upwardly from surface 5f and form channels 5d leading towards the drainage aperture. As shown, each grid is provided with a pair of such drainage apertures 8 which communicates with complementary openings 9 in the bands 6. A pair of suction boxes 10 are mounted in the frame and it will be apparent that, during the upper horizontal portion of travelling movement of the assembly, apertures 8 are in communication with the suction boxes through openings 9. It will be apparent that, in the case where each grid has only one operture 8, only one suction box will be required.

One shaft 2 is driven to impart driving motion to sprockets 4 and the filter assembly is drivably connected thereto by means of a pair of chains 11 carried by the bottom surface of grids 5 and each comprising a series of rollers 12 which are received in peripheral recesses 13 in the sprockets 4. It will be observed that each chain 11 is located adjacent the side edges of the series of grids but is spaced inwardly from such side edges.

An endless filter medium 14 of filter cloth, wire or the like extends over and in contact with grids 5 during the upper horizontal portion of travelling movement thereof, such filter medium also extending over the grids during a portion of their movement over the sprockets 4. The filter medium 14 is, however, supported and guided on rollers 15 during the return movement thereof to dispose it below and in spaced relation to the grids during the return or lower horizontal travelling movement of the latter. The filter medium 14, during such return movement, may be subjected to the cleansing action of air or water jets (not shown). Pans 16 may be provided to receive the sprayed liquid.

Means are provided to retain the material under treatment, which is normally in flowable condition, on the filter assembly during the upper travelling portion of its movement. Such means may comprise an endless flexible strip 17 of rubber, fabric, or the like, fixed to each of the aligned side edges of the grids 5, and projecting laterally therefrom. The strips 17 are supported on a series of rollers 18 during the lower travelling movement thereof and by pulleys or sprockets 19 mounted on shafts 2 as the grids move around the sprockets 4. However, as the endless assembly approaches its upper portion of movement, an inclined guide 20, fixed to the frame, engages each strip 17 and swings it upwardly as indicated in FIGURE 2, to impart a troughlike shape to the filter medium 14 during its corresponding portion of movement.

Referring to FIGURE 3, means are provided for treating the filter cake to bring it down to final or substantially complete dryness. For this purpose, a dryer, generally indicated at 21, is associated with the filter apparatus described. The dryer illustrated is located adjacent the discharge end of the apparatus, a feeding means 22 being indicated at the other end thereof. An endless screen of filter medium 23 extends over the filter medium 14 and continues over a drum 24 mounted in the auxiliary frame 25 of the dryer. The screen 23, as it leaves the filter medium 14, carries with it the filter cake which is conducted through a chamber 26 formed by a casing 27. A heater 28 is arranged to supply heat to the chamber by means of a conduit 29 adjacent the screen exit end of the chamber. An exhaust fan 30 is located adjacent the screen entrance end of the chamber. Thus, it will be apparent that the filter cake will be moved through the chamber in countercurrent flow to a stream of hot gases. Baffles 31 above the screen and baffles 32 below the screen and in staggered relation to baffles 31 direct the flow of hot gases through the screen and filter cake. Rakes 33 may be provided to assist the drying action. The return travelling portion of the screen may be supported of rollers 34.

Referring to FIGURES 4 to 7, a somewhat modified form of apparatus is illustrated. The apparatus includes a plurality of rigid grids corresponding to grids 5 but, as shown, the grid 35 has but a single drainage aperture 36, with associated band 6 and suction box 10. A ferrule 37 extending into apertures 36 and 9 may be provided to ensure a positive connection between grid 35 and band 6.

In order to provide substantially complete and uniform alignment of the filter medium 14 at all times, a pair of endless chains 38 are provided to ensure the turning of the rolls supporting the filter medium, thus reducing friction and at the same time helping to maintain the desired alignment of the filter medium. Where the filter medium is of substantial width, it may be desirable to attach its edges at intervals to the chains as by brackets 39. The chains 38 are of equal length and substantially equal in length with that of the filter medium and each, as shown, is located adjacent and slightly beyond the respective edge of the filter medium. The chains 38 are supported on the pulleys 19 each of which may be provided with an outer radial flange 40 to retain the chain thereon. It will be understood that sprockets may be substituted for the pulleys 19. The horizontal portion of each chain is supported on a track 41 fixed to the frame. It will be apparent that the chains 38 will cause each side of the filter medium to travel an equal distance and prevent creeping of one side ahead of the other with resulting disalignment. It is important to note that use of ropes, belts or like means instead of chains or chainlike belts would not be effective since use of such means would result in creepage due to differences in friction, diameters or lengths of such means.

I claim:

A filtering apparatus comprising a frame, an endless filter assembly having a series of rigid grids arranged with their side edges in aligned relation, and a pair of chains connecting said grids, each said chain being spaced inwardly of a respective series of aligned side edges of said grids, a pair of shafts journalled in said frame, sprockets mounted on said shafts and supporting said assembly for travelling movement thereof, said assembly having an upper horizontal portion of travelling movement, an endless flexible member secured to the bottom surfaces of said grids, said grids and flexible member having communicating passages, a suction box in engagement with said flexible member and communicating with said passages, a flexible strip fixed to each series of aligned side edges of said grids and projecting laterally therefrom, each said series of aligned side edges and said flexible strip fixed thereto lying laterally outwardly of the adjacent one of said chains, means supporting said strips comprising a pair of pulleys on each of said shafts, each said pulley being located laterally outwardly of one of said sprockets and having a peripheral surface in engagement with one of said strips, means applying an upward bending action to said strips during their upper horizontal portion of movement, an endless filter medium supported on said grids, and means for maintaining said filter medium in alignment during travelling movement thereof comprising a chain fixed to each longitudinal edge of said filter medium, said filter medium chains being mounted on said peripheral surfaces of said pulleys for support thereby, and a pair of tracks mounted on said frame and each engaging one of said filter medium chains for support thereby, each of said filter medium chains having a length substantially equal to that of said filter medium.

References Cited in the file of this patent

UNITED STATES PATENTS

| | | |
|---|---|---|
| 1,848,877 | Gay | Mar. 8, 1932 |
| 2,873,028 | Bried | Feb. 10, 1959 |
| 2,880,875 | Alston | Apr. 7, 1959 |